United States Patent
Jing et al.

(10) Patent No.: US 9,774,288 B1
(45) Date of Patent: Sep. 26, 2017

(54) CONTROL OF SWITCHING FREQUENCY IN ELECTRIC MACHINE ASSEMBLY

(71) Applicant: GM GLOBAL TECHNOLOGY OPERATIONS LLC, Detroit, MI (US)

(72) Inventors: Xin Jing, Rochester, MI (US); Brian A. Welchko, Oakland, MI (US); Constantin C. Stancu, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/225,941

(22) Filed: Aug. 2, 2016

(51) Int. Cl.
*H02P 27/04* (2016.01)
*H02P 23/28* (2016.01)
*H02P 27/08* (2006.01)
*H02P 6/08* (2016.01)

(52) U.S. Cl.
CPC ............... *H02P 23/28* (2016.02); *H02P 6/08* (2013.01); *H02P 27/08* (2013.01)

(58) Field of Classification Search
CPC .......... H02P 27/04; H02P 27/06; H02P 21/00; H02P 1/46; H02P 1/48; H02P 3/00; H02P 5/00; H02P 6/00; H02P 7/00
USPC .... 318/400.01, 400.02, 400.14, 400.15, 700, 318/701, 727, 606, 607, 807, 800, 801, 318/78, 430, 432, 437, 599, 811; 363/8, 363/9, 21.1, 40, 41, 44, 95, 120, 157, 363/165, 174, 175; 324/328; 331/37
See application file for complete search history.

(56) References Cited

U.S. PATENT DOCUMENTS

2016/0329714 A1\* 11/2016 Li ........................... H02M 7/44

OTHER PUBLICATIONS

Dongsheng Li, Yasuo Notohara, Wataru Hatsuse, Kenji Tamura and Tatsuo Ando, Beatless Control in Over-Modulation Range for Permanent Magnet Synchronous Motor Drives, IEEE article, 2015, 978-1-4673-7151-3/15, pp. 5634-5641.
Joachim Holtz and Bernd Beyer, Optimal Pulsewidth Modulation for AC Servos and Low-Cost Industrial Drives, IEEE Transactions on Industry Applications, Aug. 1994, vol. 30, No. 4, pp. 1039-1047.

\* cited by examiner

*Primary Examiner* — Antony M Paul
(74) *Attorney, Agent, or Firm* — Quinn IP Law

(57) ABSTRACT

An electric machine assembly includes an electric machine, an inverter configured to provide pulse-width modulation characterized by a switching frequency and a controller. The controller has a processor and tangible, non-transitory memory on which is recorded instructions for executing a method of controlling the switching frequency to minimize a beat frequency phenomenon. Execution of the instructions by the processor causes the controller to obtain a first function ($G_1$) and a second function ($G_2$) based at least partially on the original pulse ratio ($PR_O$). The original pulse ratio ($PR_O$) is a ratio of the switching frequency and a predefined fundamental frequency. If each of a plurality of conditions are met, a new pulse ratio ($PR_N$) is determined based at least partially on the original pulse ratio ($PR_O$), the first function ($G_1$) and the second function ($G_2$).

17 Claims, 3 Drawing Sheets

CONTROL OF SWITCHING FREQUENCY IN ELECTRIC MACHINE ASSEMBLY

TECHNICAL FIELD

The disclosure relates generally to control of switching frequency in an electric machine assembly.

BACKGROUND

An electric machine, such as an interior permanent magnet machine, generally includes a rotor rotatable within a stator. In an electric machine assembly having an inverter providing pulse-width modulation, a rhythmic or periodic distortion of the electric machine current occurs, referred to herein as the beat frequency phenomenon. The beat frequency phenomenon induces a relatively large harmonic content to the phase currents.

SUMMARY

An electric machine assembly includes a controller, an electric machine and an inverter configured to provide pulse-width modulation characterized by a switching frequency. The controller has a processor and tangible, non-transitory memory on which is recorded instructions for executing a method of controlling the switching frequency to minimize a beat frequency phenomenon. In a first embodiment, the controller is programmed to obtain a first function ($G_1$) and a second function ($G_2$) based at least partially on an original pulse ratio ($PR_O$). The original pulse ratio ($PR_O$) is a ratio of the switching frequency and a predefined fundamental frequency. The controller is programmed to determine if each of a plurality of conditions are met. If each of the plurality of conditions are met, a new pulse ratio ($PR_N$) is determined based at least partially on the original pulse ratio ($PR_O$), the first function ($G_1$) and the second function ($G_2$). The controller is operative to control at least one operating parameter of the electric machine based at least partially on the new pulse ratio ($PR_N$).

If each of the plurality of conditions are met and if the second function ($G_2$) is less than a threshold (T), the controller is programmed to select the first function ($G_1$) as the new pulse ratio ($PR_N=G_1$). If each of the plurality of conditions are met and if the second function ($G_2$) is greater or equal to the threshold (T), the controller is programmed to select the original pulse ratio as the new pulse ratio ($PR_N=PR_O$). If at least one of the plurality of conditions is not met, the controller is programmed to select the original pulse ratio as the new pulse ratio ($PR_N=PR_O$).

The controller is programmed to determine a new switching frequency as a product of the new pulse ratio and the fundamental frequency. The first function ($G_1$) and the second function ($G_2$) may be defined as: $G_1=6*\text{ROUND}[PR_O/6]$; and $G_2=\text{ABSOLUTE VALUE}[PR_O-G_1]$.

The plurality of conditions may include: a six-step pulse-width-modulation operation not being in effect; and a modulation index being at or above a threshold modulation index. The plurality of conditions may include: the original pulse ratio being less than a calibrated value; and the original pulse ratio not being equal to the first function ($G_1$).

In a second embodiment, the controller is programmed to obtain a first function ($H_1$), a second function ($H_2$) and a third function ($H_3$) based at least partially on the original pulse ratio ($PR_O$), which is a ratio of the switching frequency and a predefined fundamental frequency. The controller is programmed to determine if each of a plurality of conditions are met and determine a scaling factor (S) based at least partially on the first function ($H_1$). If each of the plurality of conditions are met, a new pulse ratio ($PR_N$) is determined based at least partially on the original pulse ratio ($PR_O$), the scaling factor (S), the second function ($H_2$) and the third function ($H_3$).

If each of the plurality of conditions are met and if the second function ($H_2$) is less than the scaling factor (S), the controller is programmed to select the new pulse ratio such that $PR_N=(H_1-1-S)$. If each of the plurality of conditions are met and if the second function ($H_2$) is greater than or equal to the scaling factor (S), the controller is programmed to determine if the third function ($H_3$) is less than the scaling factor (S). If each of the plurality of conditions are met, the second function ($H_2$) is greater than or equal to the scaling factor (S), and the third function ($H_3$) is less than the scaling factor (S), the controller is programmed to select the new pulse ratio such that $PR_N=(H_1+1-S)$.

If each of the plurality of conditions are met, the second function ($H_2$) is greater than or equal to the scaling factor (S), and the third function ($H_3$) is greater than or equal to the scaling factor (S), the controller is programmed to select the new pulse ratio ($PR_N=PR_O$) as the original pulse ratio. The first function ($H_1$), the second function ($H_2$) and the third function ($H_3$) may be defined as: $H_1=6*\text{ROUND}[PR_O/6]$; $H_2=\text{ABSOLUTE VALUE}[PR_O-(H_1-1)]$; and $H_3=\text{ABSOLUTE VALUE}[PR_O-(H_1+1)]$.

The above features and advantages and other features and advantages of the present disclosure are readily apparent from the following detailed description of the best modes for carrying out the disclosure when taken in connection with the accompanying drawings.

DETAILED DESCRIPTION

Figure 1:
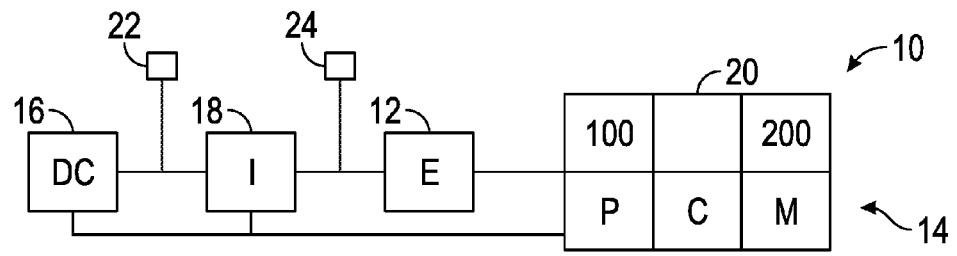
FIG. 1 is a schematic diagram of an electric machine assembly having an electric machine and a controller.

Referring to the drawings, wherein like reference numbers refer to like components, FIG. 1 schematically illustrates an electric machine assembly 10. The assembly 10 includes an electric machine 12 ("E"). The electric machine 12 may include a stator (not shown) and a rotor (not shown). The electric machine 12 may be a type of any alternating current machine known to those skilled in the art, including but not limited to induction or synchronous machines. The assembly 10 may be a component of a device 14. The device 14 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 14 may be a non-mobile platform. The device 14 may take many different forms and include multiple and/or alternate components and facilities.

Referring to FIG. 1, a battery pack 16 ("DC") may be operatively connected to the electric machine 12 as a source of DC link voltage. Alternatively, the DC link voltage may be obtained from any type of DC source. An inverter 18 ("I") may be operatively connected to the electric machine 12 and configured to convert DC to AC voltage. The inverter 18 is configured to provide pulse-width modulation to control the power supplied to the electric machine 12. As understood by those skilled in the art, pulse-width modulation is a modulation technique for encoding a message into a pulsing signal and may be employed to control power supplied to a load, such as the electric machine 12. The amplitude and phase of the voltage and current supplied to the electric machine 12 is controlled by rapidly turning on and off a switch between the power source and the load, known as the switching frequency.

Figure 2A:
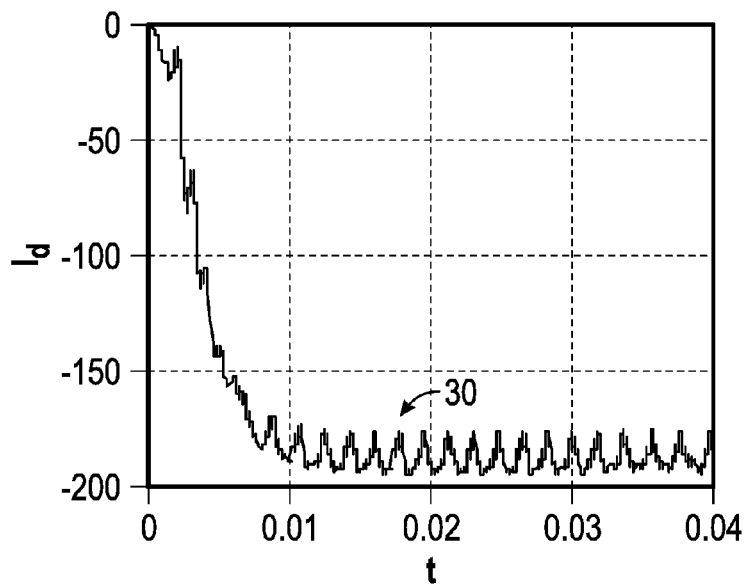
FIG. 2A is an example graph of current versus time for the electric machine of FIG. 1, illustrating the presence of a beat frequency phenomenon.
Figure 2B:
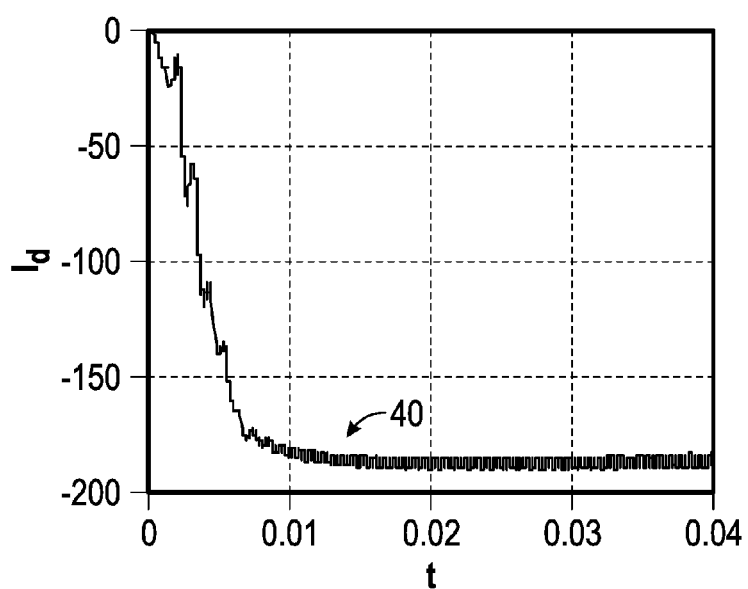
FIG. 2B is an example graph of current versus time for the electric machine of FIG. 1, after application of the first method to minimize the beat frequency phenomenon.

The presence of pulse-width modulation leads to a rhythmic or periodic distortion of the phase current in the electric machine 12, referred to herein as the beat frequency phenomenon. FIG. 2A is an example trace 30 of current ($I_d$) versus time for the electric machine 12 of FIG. 1 (prior to application of method 100 described below). Trace 30 illustrates the presence of the beat frequency phenomenon. The beat frequency phenomenon induces a relatively large harmonic content to the phase currents. The beat frequency phenomenon is particularly pronounced at low pulse ratios in the over-modulation region. Referring to FIG. 2B, an example trace 40 of current ($I_d$) versus time for the electric machine 12 of FIG. 1 after application of the method 100, described below, for minimizing the beat frequency phenomenon.

Referring to FIG. 1, the assembly 10 includes a controller 20 ("C") operatively connected to or in electronic communication with the electric machine 12 and inverter 18. The controller 20 includes at least one processor P and at least one memory M (or any non-transitory, tangible computer readable storage medium) on which are recorded instructions for executing a method 100 and/or method 200, shown in FIGS. 3-4, respectively of controlling the switching frequency to minimize the beat frequency phenomenon. The memory M can store controller-executable instruction selects, and the processor P can execute the controller-executable instruction selects stored in the memory M. Methods 100, 200 need not be applied in the specific order recited herein. Furthermore, it is to be understood that some blocks may be minimized.

The switching frequency ($F_s$) is controlled via a pulse ratio (PR), which may be defined as the ratio of the switching frequency to a fundamental frequency (FF), i.e., PR=($F_s$/FF). The controller 20 of FIG. 1 is specifically programmed to execute the blocks of the methods 100, 200 (as discussed in detail below) and can receive inputs from various sensors. Additionally, controller 20 may be programmed to determine various physical factors by modeling or any other estimation technique known to those skilled in the art.

The beat frequency phenomenon induces a relatively large harmonic content to the phase currents, especially when the pulse ratio is a non-second and non-third number (i.e. not a multiple of 2 or 3), such as 11, 13, 17. The modified switching frequency could make the pulse ratio as sixth order, which makes the current waveform quality better when compared with non-sixth order pulse ratios. The methods 100 and 200 are configured to minimize the beat frequency phenomenon, reduce low order harmonics contents in DQ currents and improve the current waveform quality at low pulse ratio in the over-modulation region, thereby improving functioning of the assembly 10.

Figure 3:
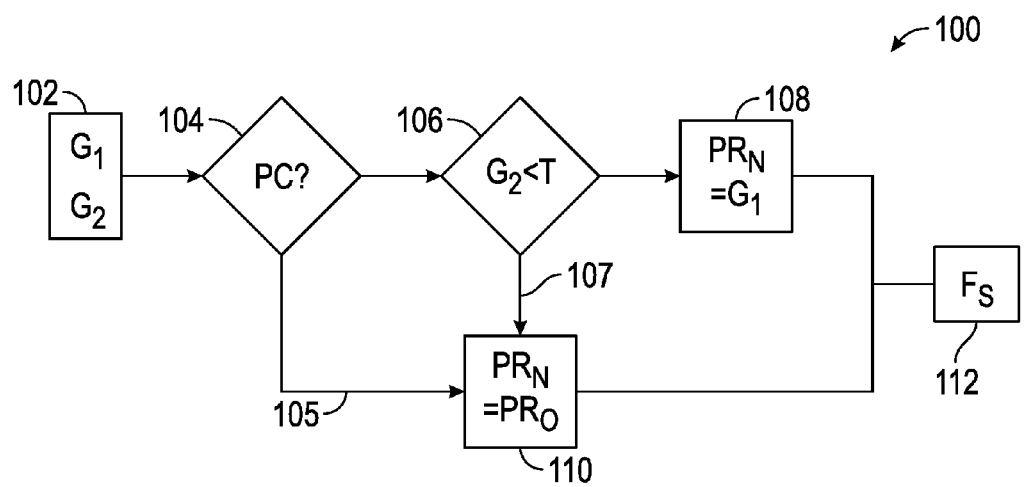
FIG. 3 is a flowchart for a method executable by the controller of FIG. 1, in accordance with a first embodiment.

In accordance with a first embodiment and referring now to FIG. 3, a flowchart of the method 100 stored on and executable by the controller 20 of FIG. 1 is shown. Referring to FIG. 3, method 100 may begin with block 102, where the controller 20 is programmed or configured to obtain a first function ($G_1$) and a second function ($G_2$) based at least partially on the original pulse ratio ($PR_0$). In one embodiment, the first function ($G_1$) and the second function ($G_2$) are defined as:

$$G_1 = 6 * \text{ROUND}[PR_0/6]; \text{ and}$$

$$G_2 = \text{ABSOLUTE VALUE}[PR_0 - G_1].$$

As understood by those skilled in the art, the "round" function rounds the value in parenthesis to the nearest integer. In block 104 of FIG. 3, the controller 20 is programmed to determine if each of a plurality of conditions ("PC?") are met. The plurality of conditions may include some or all of the conditions listed below. The plurality of conditions may include: the original pulse ratio being less than a calibrated value. The plurality of conditions may include: the original pulse ratio not being equal to the first function ($G_1$).

The plurality of conditions may include: a six-step pulse-width-modulation operation not being in effect. As understood by those skilled in the art, a six-step pulse-width-modulation (PWM) operation is a mode of operation wherein the voltage vector is applied at six intervals (for a 3 phase inverter) during one fundamental cycle (i.e. electrical speed). The six-step pulse-width-modulation (PWM) operation is a desired mode of operation for increasing the efficiency of the assembly 10 (electric machine 12 plus the inverter 18) at low to light load or torque conditions and for increasing voltage utilization to increase peak torque of the electric machine 12. The six-step pulse-width-modulation (PWM) operation is employed in a high speed region from zero torque to the peak torque capability of the electric machine 12.

The plurality of conditions may include: a modulation index being at or above a threshold modulation index. The modulation index may be defined as a percentage of the maximum possible motor phase to neutral output voltage that the assembly 10 can produce. In one embodiment, the modulation index is defined as:

$$\text{Modulation Index} = \frac{\text{Output Voltage}}{\frac{2}{\pi} * \text{DC Link voltage}}$$

In the embodiment shown, the DC link voltage is the input DC voltage before the inverter 18, which may be measured via a first sensor 22. The output voltage of the inverter 18 may be measured via a second sensor 24. Alternatively, the output voltage and the DC link voltage may be estimated or modeled from any estimation technique known to those skilled in the art. The modulation index may be defined differently, based on the application at hand.

If each of the plurality of conditions, per block 104, is met, the method 100 proceeds to block 106. In block 106, the controller 20 is programmed to determine if the second function ($G_2$) is less than a threshold (T). If the second function ($G_2$) is less than the threshold (T) per block 106, the method 100 proceeds to block 108 where the controller 20 is programmed to select the first function ($G_1$) as the new pulse ratio ($PR_N = G_1$).

If the second function ($G_2$) is greater or equal to the threshold (T) per block 106 (and each of the plurality of conditions are met), the method 100 proceeds to block 110 as indicated by line 107. In block 110, the controller 20 is programmed to select the original pulse ratio as the new pulse ratio ($PR_N=PR_O$). Thus, if each of the plurality of conditions are met, a new pulse ratio ($PR_N$) is determined based at least partially on the original pulse ratio ($PR_O$), the first function ($G_1$) and the second function ($G_2$). If at least one of the plurality of conditions is not met, the method 100 proceeds to block 110 as indicated by line 105, where the controller 20 is programmed to select the original pulse ratio as the new pulse ratio ($PR_N=PR_O$).

From blocks 108 and 110, the method 100 proceeds to block 112 where the controller 20 is programmed to determine a new switching frequency ($F_s$) as a product of the new pulse ratio ($PR_N$) and a predetermined fundamental frequency (FF), i.e., $F_s=(PR_N*FF)$. The controller 20 is operative to control at least one operating parameter of the electric machine 12 based at least partially on the new pulse ratio ($PR_N$) and the new switching frequency ($F_s$).

Figure 4:
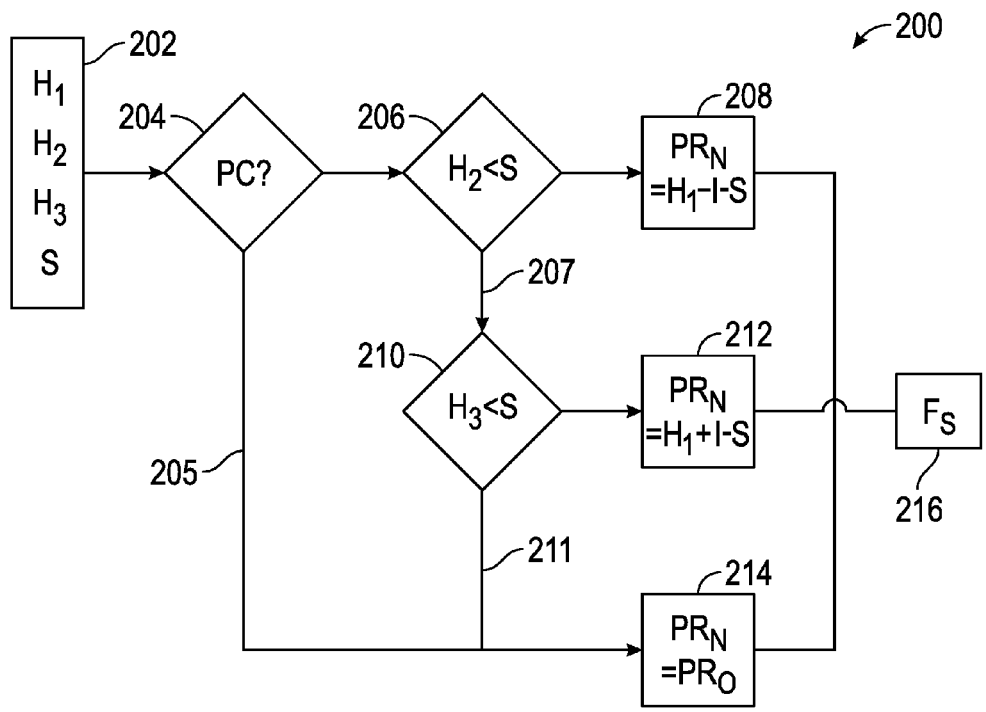
FIG. 4 is a flowchart for another method executable by the controller of FIG. 1, in accordance with a second embodiment.

In accordance with a second embodiment and referring now to FIG. 4, a flowchart of the method 200 stored on and executable by the controller 20 of FIG. 1 is shown. Referring to FIG. 4, method 200 may begin with block 202, where the controller 20 is programmed or configured to obtain a function ($H_1$), a second function ($H_2$) and a third function ($H_3$) based at least partially on the original pulse ratio ($PR_O$). In one embodiment, the first function ($H_1$), the second function ($H_2$) and the third function ($H_3$) are defined as follows:

$$H_1 = 6*ROUND[PR_O/6];$$

$$H_2 = ABSOLUTE\ VALUE[PR_O-(H_1-1)];\ and$$

$$H_3 = ABSOLUTE\ VALUE[PR_O-(H_1+1)].$$

In block 202, the controller 20 may be programmed to determine a scaling factor (S) based at least partially on the first function ($H_1$). The scaling factor (S) may be obtained from a look-up table based on the first function ($H_1$). The term "look-up table" is intended to represent any type of table, data repository or data storage known to those skilled in the art. The look-up table may be obtained in a testing dynamo or lab conditions. In one example, the scaling factor (S) has a value of 1.

In block 204 of FIG. 4, the controller 20 is programmed to determine if each of a plurality of conditions (PC?) are met. The plurality of conditions may be the same as described above with respect to method 100. The plurality of conditions may be defined differently based on the application at hand.

If each of the plurality of conditions is met in block 204, the method 200 proceeds to block 206. In block 206, the controller 20 is programmed to determine if the second function ($H_2$) is less than the scaling factor (S). If the second function ($H_2$) is less than the scaling factor (S), the method 200 proceeds to block 208 where the controller 20 is programmed to select the new pulse ratio such that $PR_N=(H_1-1-S)$.

If each of the plurality of conditions is met and if the second function ($H_2$) is greater than or equal to the scaling factor (S), the method 200 proceeds to block 210, as indicated by line 207. In block 210, the controller 20 is programmed to determine if the third function ($H_3$) is less than the scaling factor (S). If each of the plurality of conditions is met, the second function ($H_2$) is greater than or equal to the scaling factor (S), and the third function ($H_3$) is less than the scaling factor (S), the method 200 proceeds to block 212, where the controller 20 is programmed to select the new pulse ratio such that $PR_N=(H_1+1-S)$.

If at least one of the plurality of conditions is not met, the method 200 proceeds to block 214 as indicated by line 205, where the controller 20 is programmed to select the original pulse ratio as the new pulse ratio ($PR_N=PR_O$). If each of the plurality of conditions is met, the second function ($H_2$) is greater than or equal to the scaling factor (S), and the third function ($H_3$) is greater than or equal to the scaling factor (S), the method 200 proceeds to block 214, as indicated by line 211. In block 214, the controller 20 is programmed to select the new pulse ratio ($PR_N=PR_O$) as the original pulse ratio.

From blocks 208, 210 and 212, the method 200 proceeds to block 216 where the controller 20 is programmed to determine a new switching frequency ($F_s$) as a product of the new pulse ratio ($PR_N$) and a predetermined fundamental frequency (FF), i.e., $F_s=(PR_N*FF)$. The controller 20 is operative to control at least one operating parameter of the electric machine 12 based at least partially on the new pulse ratio ($PR_N$) and the new switching frequency ($F_s$).

Figure 5:
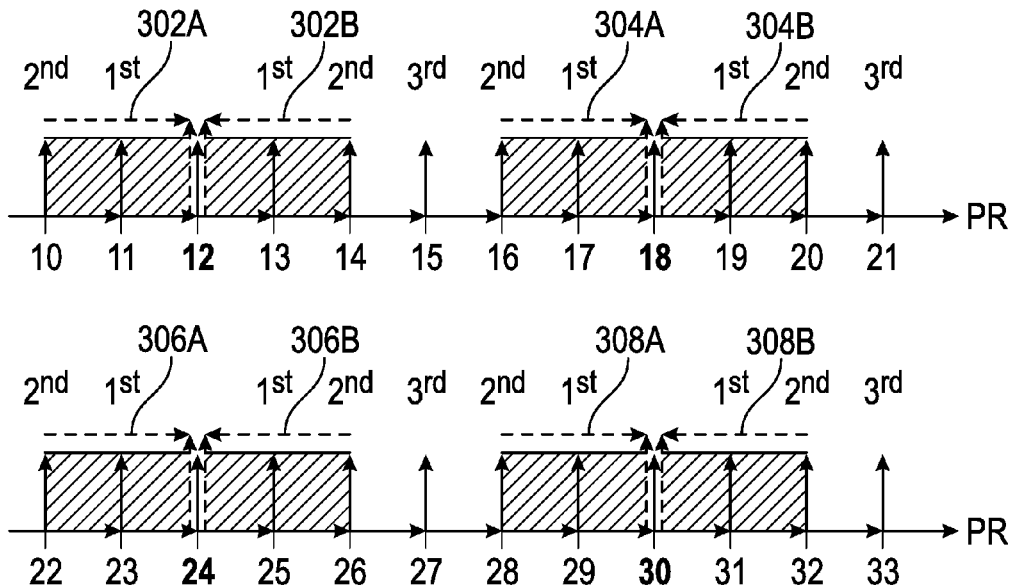
FIG. 5 is an example schematic illustration of changing pulse ratio (or switching frequency) zones obtained by the method of FIG. 3, in accordance with the first embodiment.
Figure 6:
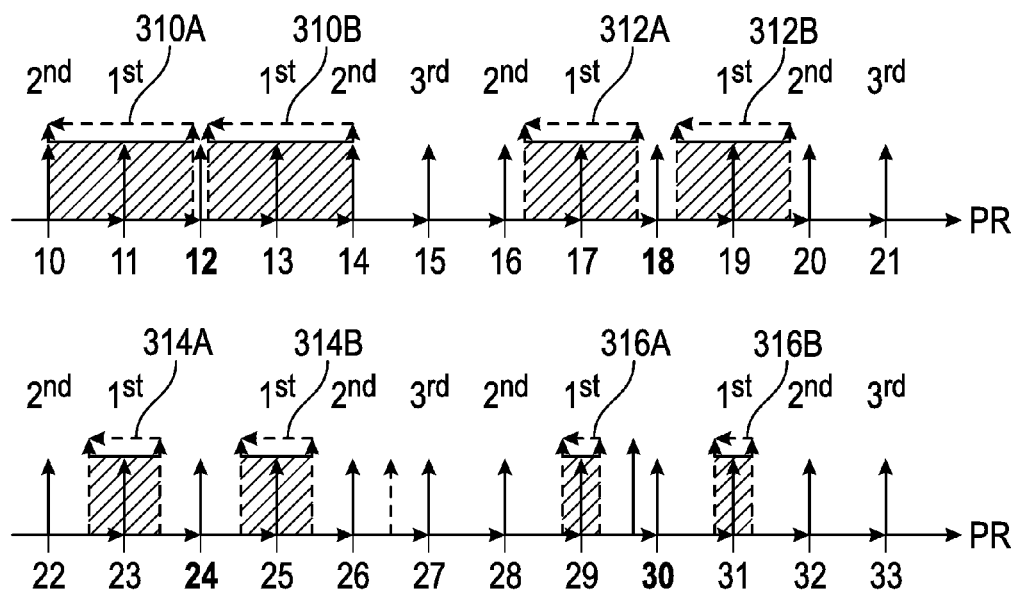
FIG. 6 is an example schematic illustration of changing pulse ratio (or switching frequency) zones obtained by the method of FIG. 4, in accordance with the second embodiment.

FIG. 5 is an example schematic illustration of changing pulse ratio (or switching frequency) zones obtained by the method 100 of FIG. 3, in accordance with the first embodiment. FIG. 6 is an example schematic illustration of changing pulse ratio (or switching frequency) zones obtained by the method 200 of FIG. 4, in accordance with the second embodiment. In FIGS. 5-6, the pulse ratio is shown on the horizontal axes, with the $6^{th}$ order pulse ratio (i.e., multiples of six such as PR=12, 18, 24, 32 etc.) in bold. In FIGS. 5-6, the respective shaded/hatched portions represent pulse ratios that are changed in the methods 100, 200, respectively, while the respective un-shaded portions represent pulse ratios that are unchanged in the methods 100, 200, respectively. In FIGS. 5-6, the harmonics are labeled $1^{st}$, $2^{nd}$ and $3^{rd}$.

Referring to FIG. 5, in the method 100, each of the directions 302A, 302B, 304A, 304B, 306A, 306B, 308A and 308B (representing regions below and above PR=12, 18, 24, 30, respectively) point towards the respective $6^{th}$ order pulse ratio such that the pulse ratio inputted into method 100 is shifted towards the $6^{th}$ order pulse ratio (PR=12, 18, 24, 30, respectively).

Referring to FIG. 6, in the method 200, each of the directions 310B, 312B, 314B and 316B (representing regions above PR=12, 18, 24, 30, respectively) point towards the respective $6^{th}$ order pulse ratio. In other words, the respective pulse ratios inputted into method 200 from regions above PR=12, 18, 24, 30, are shifted towards the respective $6^{th}$ order pulse ratio (PR=12, 18, 24, 30, respectively etc.). However, the directions 310A, 312A, 314A and 316A (regions below PR=12, 18, 24, 30, respectively) point away from the respective $6^{th}$ order pulse ratio. Thus the respective pulse ratios inputted into method 200 from regions below PR=12, 18, 24, 30, are shifted away from the $6^{th}$ order pulse ratio (PR=12, 18, 24, 30, respectively). The scaling factor (S) may be selected to alter the size of the respective shaded/hatched portions in FIG. 6.

In summary, the methods 100, 200 of switching frequency control are based on the pulse ratio to minimize the influence of the beat frequency at low pulse ratios in the overmodulation region.

The controller 20 of FIG. 1 may be an integral portion of, or a separate module operatively connected to, other controllers of the assembly 10. The controller 20 (of FIG. 1 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a selection of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electric machine assembly comprising:
an electric machine and an inverter configured to provide pulse-width modulation characterized by a switching frequency;
a controller operatively connected to the electric machine and inverter;
wherein the controller has a processor and tangible, non-transitory memory on which is recorded instructions for executing a method of controlling the switching frequency to minimize a beat frequency phenomenon, execution of the instructions by the processor causing the controller to:
obtain a first function ($G_1$) and a second function ($G_2$) based at least partially on an original pulse ratio ($PR_O$), the original pulse ratio ($PR_O$) being a ratio of the switching frequency and a predefined fundamental frequency;
determine if each one of a plurality of conditions are met;
if each of the plurality of conditions are met, determine a new pulse ratio ($PR_N$) based at least partially on the original pulse ratio ($PR_O$), the first function ($G_1$) and the second function ($G_2$); and
wherein the controller is operative to control at least one operating parameter of the electric machine based at least partially on the new pulse ratio ($PR_N$).

2. The assembly of claim 1, wherein:
if each of the plurality of conditions are met and if the second function ($G_2$) is less than a threshold (T), the controller is programmed to select the first function ($G_1$) as the new pulse ratio ($PR_N=G_1$).

3. The assembly of claim 1, wherein:
if each of the plurality of conditions are met and if the second function ($G_2$) is greater or equal to the threshold (T), the controller is programmed to select the original pulse ratio as the new pulse ratio.

4. The assembly of claim 1, wherein:
if at least one of the plurality of conditions is not met, the controller is programmed to select the original pulse ratio as the new pulse ratio.

5. The assembly of claim 1, wherein the controller is programmed to determine a new switching frequency as a product of the new pulse ratio ($PR_N$) and a fundamental frequency (FF).

6. The assembly of claim 1, wherein: the first function ($G_1$) and the second function ($G_2$) are defined as:

$$G_1 = 6*\text{ROUND}[PR_O/6]; \text{ and}$$

$$G_2 = \text{ABSOLUTE VALUE}[PR_O - G_1].$$

7. The assembly of claim 1, wherein the plurality of conditions include:
a six-step pulse-width-modulation operation not being in effect; and
a modulation index being at or above a threshold modulation index.

8. The assembly of claim 1, wherein the plurality of conditions include:
the original pulse ratio being less than a calibrated value; and
the original pulse ratio not being equal to the first function ($G_1$).

9. An electric machine assembly comprising:
an electric machine and an inverter configured to provide pulse-width modulation characterized by a switching frequency;
a controller operatively connected to the electric machine and inverter;
wherein the controller has a processor and tangible, non-transitory memory on which is recorded instructions for executing a method of controlling the switching frequency to minimize a beat frequency phenomenon, execution of the instructions by the processor causing the controller to:
obtain a first function ($H_1$), a second function ($H_2$) and a third function ($H_3$) based at least partially on an original pulse ratio ($PR_O$), the original pulse ratio ($PR_O$) being a ratio of the switching frequency and a predefined fundamental frequency;
determine if each of a plurality of conditions are met;
determine a scaling factor (S) based at least partially on the first function ($H_1$);
if each of the plurality of conditions are met, determine a new pulse ratio ($PR_N$) based at least partially on the original pulse ratio ($PR_0$), the scaling factor (S), the second function ($H_2$) and the third function ($H_3$); and wherein the controller is operative to control at least one operating parameter of the electric machine based at least partially on the new pulse ratio ($PR_N$).

10. The assembly of claim 9, wherein:

if each of the plurality of conditions are met and if the second function ($H_2$) is less than the scaling factor (S), the controller is programmed to select the new pulse ratio such that $PR_N = (H_1 - 1 - S)$.

11. The assembly of claim 9, wherein:

if each of the plurality of conditions are met and if the second function ($H_2$) is greater than or equal to the scaling factor (S), the controller is programmed to determine if the third function ($H_3$) is less than the scaling factor (S); and if each of the plurality of conditions are met, the second function ($H_2$) is greater than or equal to the scaling factor (S), and the third function ($H_3$) is less than the scaling factor (S), the controller is programmed to select the new pulse ratio such that $PR_N = (H_1 + 1 - S)$.

12. The assembly of claim 9, wherein:

if each of the plurality of conditions are met, the second function ($H_2$) is greater than or equal to the scaling factor (S), and the third function ($H_3$) is greater than or equal to than the scaling factor (S), the controller is programmed to select the new pulse ratio ($PR_N = PR_0$) as the original pulse ratio.

13. The assembly of claim 9, wherein the controller is programmed to determine a new switching frequency as a product of the new pulse ratio and the fundamental frequency.

14. The assembly of claim 9, wherein: the first function ($H_1$), the second function ($H_2$) and the third function ($H_3$) are defined as:

$$H_1 = 6 * ROUND[PR_0/6];$$

$$H_2 = ABSOLUTE\ VALUE[PR_0 - (H_1 - 1)];\ and$$

$$H_3 = ABSOLUTE\ VALUE[PR_0 - (H_1 + 1)].$$

15. The assembly of claim 9, wherein the plurality of conditions include:

a six-step pulse-width-modulation not being in operation; and a modulation index being at or above a threshold modulation index.

16. The assembly of claim 9, wherein the plurality of conditions include:

the original pulse ratio being less than a calibrated value; and the original pulse ratio not being equal to the first function ($G_1$).

17. A method of controlling a switching frequency in an electric machine assembly, the assembly including an electric machine, an inverter configured to provide pulse-width modulation characterized by the switching frequency, a controller having a processor and tangible, non-transitory memory, the method comprising:

obtaining a first function ($G_1$) and a second function ($G_2$) based at least partially on an original pulse ratio ($PR_0$), the original pulse ratio ($PR_0$) being a ratio of the switching frequency and a predefined fundamental frequency;

determining if each one of a plurality of conditions are met;

if each of the plurality of conditions are met and if the second function ($G_2$) is less than a threshold (T), then selecting the first function ($G_1$) as a new pulse ratio ($PR_N = G_1$);

if each of the plurality of conditions are met and if the second function ($G_2$) is greater or equal to the threshold (T), then selecting the original pulse ratio as the new pulse ratio;

if at least one of the plurality of conditions is not met, then selecting the original pulse ratio as the new pulse ratio;

determining a new switching frequency as a product of the new pulse ratio and a fundamental frequency; and controlling the electric machine based upon the new switching frequency.

* * * * *